Patented Mar. 17, 1942

2,277,010

UNITED STATES PATENT OFFICE 2,277,010

PROCESS OF SEPARATION OF ORE MATERIALS

Robert B. Booth, Springdale, Conn., assignor to American Cyanamid Company, New York, N. Y., a corporation of Maine No Drawing. Application March 3, 1939, Serial No. 259,577

10 Claims. (Cl. 209—5)

This invention relates to the gravity separation of materials in liquid media, particularly in aqueous pulps, and more particularly the invention is directed to the use of a new class of dispersing or surface modifying agents in such processes.

Many processes involve the separation by differences in specific gravity in aqueous and other media. Usually the desired result is to obtain separation by differential settling; in other cases it is desired to cause one constituent to sink and the other to rise. In many cases where slimy material is present, clean separation is prevented and in other cases, the slimy material may floc and acquire a characteristic at variance with its normal characteristics. Thus, for example, when very fine materials which would normally remain in suspension or float off in specific gravity separations floc together, they acquire the characteristics of larger particles and either tend to sink or to deposit themselves on surfaces of apparatus in which they are being treated.

According to the present invention, a new class of dispersants, namely, dyes having solubilizing groups, especially sulfonic groups, is used. While dyes containing solubilizing groups are in general operative with certain materials, there is a great difference in effectiveness between different solubilized dyes. I have found that four coloring matters give excellent results and two of these materials are outstanding. The four materials referred to are solubilized Nigrosine (C. I. 865), an earth color sold in the trade as Sap Brown, Sun Yellow (C. I. 620), and the sulfonated tar residue from beta-naphthol stills. Of these four materials, sulfonated Nigrosine and Sap Brown are outstanding. The present invention is, therefore, particularly directed to the use of these four materials and in a more specific aspect, to solubilized Nigrosine and Sap Brown. "Sap Brown" is classified as a soluble natural coloring matter in the fifth edition of "A Text-Book of Paper Making," by Cross and Bevan, distributed by Chemical Publishing Company of N. Y., Inc. A definition of "Sap Brown" is found on page 272 of the above text-book.

Most of the operations involving the new dispersants belong to the field of ore dressing, such as ordinary classification, desliming, jigging, tabling, amalgamation, and the like. The invention is, however, not limited to operations involved in ore dressing and the new dispersants are also useful in other industries such as, for example, in the dispersion of clay and silt in the drilling of oil wells, the dispersion of scale-forming compounds in boiler water, and the increase of fluidity or mobility of suspensions such as sludges.

The reason why the soluble dyes of the present invention possess such extreme efficiency as dispersants is not as yet determined and the present invention is not limited to any particular theory of action.

While the dispersing property is possessed to a greater or less degree by the various dyes containing sulfonic or other solubilizing groups, the degree to which this power is possessed will vary greatly and the four colors referred to are markedly superior to the other colors which have been tested and this is particularly true of Nigrosine and Sap Brown. The effectiveness of a particular dye will also vary with the particular material although, in general, in no case have we found any other colors to be superior to Nigrosine or Sap Brown with any material.

The dispersing agents of the present invention may be used alone or they may be used with other known dispersants such as lignin sulfonates described in connection with the depression of carbon in the Breerwood Patent No. 2,130,574 dated September 20, 1938, dextrin described in my Patent No. 2,145,206 dated January 24, 1939, and the like. This advantage of the present invention greatly adds to its flexibility and to its field of usefulness. Every material presents a particular problem and the best dispersant to use, whether a single one or a mixture, will frequently vary somewhat with different materials to be treated.

It should be understood that the present invention deals with dispersion problems outside of a froth flotation cell. I do not claim here the use of solubilized dyes in froth flotation, this being the subject matter of my copending application, Serial No. 216,291 filed June 28, 1938.

The invention will be described in greater detail in conjunction with the following specific examples which illustrate the application of the invention to various processes and with various materials. These examples are illustrative only.

SAND SLIME SEPARATIONS

EXAMPLE 1

An African ore, containing gold and slimy limonite, sericite, and quartz and assaying about 0.20 oz. Au/ton, 0.02% S, 6.51% Fe, and 79.72% insoluble, was ground to minus 65 mesh, 71% minus 325 mesh. The resulting pulp contained a large amount of slimy material (slimes) which, at a pulp density of 20–40% solids, had to be dispersed before the coarser material (sands) would settle as a clean product. Samples of this pulp were treated with 1.0 lb./ton Nigrosine or Sap Brown in separate tests which were conducted in one-liter graduated cylinders. Rapid settling of the sands took place and the volumes of sands settling out in the first five minutes after treatment with the dyes are given in Table I. Volume readings were taken at thirty-second intervals.

The results of the tests with the dyes were compared with those obtained in a control test in which no dispersing agent was used and with those obtained in separate tests with 1.0 lb./ton sodium carbonate, calcium lignin sulfonate, sodium lignin sulfonate, and sodium silicate.

All these tests were carried out at a pH of 5.3, the natural pH of the pulp.

Table I

| Time, minutes | Volume (cc.) of sands | |
|---|---|---|
| | 1.0 lb./ton Sap Brown | 1.0 lb./ton Nigrosine |
| 0.5 | 20 | 25 |
| 1.0 | 50 | 48 |
| 1.5 | 70 | 68 |
| 2.0 | 88 | 88 |
| 2.5 | 102 | 100 |
| 3.0 | 118 | 115 |
| 3.5 | 128 | 125 |
| 4.0 | 138 | 135 |
| 4.5 | 145 | 145 |
| 5.0 | 150 | 150 |

No separation of sands from slimes was noted in control tests in which no dye was added, and also in separate tests with 1.0 lb./ton sodium carbonate, calcium lignin sulfonate, sodium lignin sulfonate, and sodium silicate. These latter compounds are dispersants now commonly used in metallurgical practice.

After the addition of 0.5 lb./ton sulfuric acid (pH 4.9), or 0.5 lb./ton CaO (pH 6.4), or 4.0 lbs./ton CaO (pH 9.0) to the pulp, these dyes were effective in dispersing the slimes and allowing the sands to settle as is shown by the data in Table II.

Table II

| Time, minutes | Volume (cc.) of sands | |
|---|---|---|
| | 1.0 lb./ton Nigrosine, 0.5 lb./ton CaO | 3.0 lbs./ton Sap Brown, 0.5 lb./ton CaO |
| 0.5 | 20 | 28 |
| 1.0 | 42 | 55 |
| 1.5 | 62 | 78 |
| 2.0 | 80 | 98 |
| 2.5 | 95 | 115 |
| 3.0 | 105 | 128 |
| 3.5 | 115 | 140 |
| 4.0 | 120 | 150 |
| 4.5 | 130 | 158 |
| 5.0 | 140 | 165 |

| | 4.0 lbs./ton Nigrosine, 4.0 lbs./ton CaO | 4.0 lbs./ton Sap Brown, 4.0 lbs./ton CaO |
|---|---|---|
| 0.5 | 25 | 30 |
| 1.0 | 50 | 55 |
| 1.5 | 70 | 78 |
| 2.0 | 80 | 95 |
| 2.5 | 105 | 110 |
| 3.0 | 120 | 120 |
| 3.5 | 130 | 130 |
| 4.0 | 142 | 140 |
| 4.5 | 150 | 148 |
| 5.0 | 160 | 152 |

| | 5.0 lbs./ton Nigrosine, 0.5 lb./ton $H_2SO_4$ | 5.0 lbs./ton Sap Brown, 0.5 lb./ton $H_2SO_4$ |
|---|---|---|
| 0.5 | 30 | 28 |
| 1.0 | 58 | 50 |
| 1.5 | 80 | 72 |
| 2.0 | 100 | 90 |
| 2.5 | 118 | 105 |
| 3.0 | 130 | 115 |
| 3.5 | 140 | 128 |
| 4.0 | 150 | 135 |
| 4.5 | 158 | 140 |
| 5.0 | 162 | 148 |

No separation of sands from slimes was noted in control tests in which no dye was added but 0.5 lb./ton CaO, 4.0 lbs./ton CaO and 0.5 lb./ton $H_2SO_4$, respectively.

On this same pulp, combinations of the dyes and certain alkalies were effective dispersants as indicated by the data in Table III.

Table III

| Time, minutes | Volume (cc.) of sands | |
|---|---|---|
| | 0.75 lb./ton $Na_2CO_3$, 0.50 lb./ton Sap Brown | 0.75 lb./ton $Na_2CO_3$, 0.50 lb./ton Nigrosine |
| 0.5 | 25 | 30 |
| 1.0 | 50 | 55 |
| 1.5 | 75 | 80 |
| 2.0 | 90 | 100 |
| 2.5 | 108 | 118 |
| 3.0 | 120 | 130 |
| 3.5 | 130 | 140 |
| 4.0 | 140 | 150 |
| 4.5 | 145 | 158 |
| 5.0 | 150 | 165 |

| | 0.35 lb./ton NaOH, 0.25 lb./ton Sap Brown | 0.35 lb./ton NaOH, 0.25 lb./ton Nigrosine |
|---|---|---|
| 0.5 | 28 | 30 |
| 1.0 | 55 | 58 |
| 1.5 | 80 | 80 |
| 2.0 | 100 | 100 |
| 2.5 | 115 | 115 |
| 3.0 | 128 | 128 |
| 3.5 | 138 | 138 |
| 4.0 | 148 | 148 |
| 4.5 | 152 | 155 |
| 5.0 | 160 | 160 |

Example 2

Similar tests with dyes were conducted on a slimy ore from California, containing free gold, pyrite, clay and quartz and assaying about 0.10 oz./ton Au and 0.07% S. Samples were ground to 1% on 65 mesh, 67% minus 200 mesh and suspended in one-liter graduated cylinders at a pulp density of about 40% solids. The volumes of sands settling out in the first five minutes in tests with dyes and in a control test without dyes are given in Table IV.

Table IV

| Time, minutes | Volume (cc.) of sands | | |
|---|---|---|---|
| | 0.15 lb./ton Nigrosine | 0.15 lb./ton Sap Brown | 0.5 lb./ton Sun Yellow |
| 0.5 | 50 | 50 | 55 |
| 1.0 | 100 | 100 | 115 |
| 1.5 | 138 | 140 | 160 |
| 2.0 | 168 | 170 | 192 |
| 2.5 | 190 | 190 | 218 |
| 3.0 | 208 | 210 | 235 |
| 3.5 | 222 | 225 | 250 |
| 4.0 | 235 | 235 | 262 |
| 4.5 | 245 | 245 | 270 |
| 5.0 | 252 | 252 | 280 |

No separation of sands and slimes was noted in control tests in which no dye was added.

A similar test of this California ore was conducted at a pulp density of about 50% solids. 0.75 lb./ton of sulfonated beta naphthol tar was used as the dispersing agent. The results of this test are given in Table IV—A.

*Table IV—A*

| Time, minutes | Volume (cc.) of sands, 0.75 lb./ton sulfonated beta-naphthol tar |
|---|---|
| 0.5 | 50 |
| 1.0 | 100 |
| 1.5 | 140 |
| 2.0 | 175 |
| 2.5 | 200 |
| 3.0 | 225 |
| 3.5 | 240 |
| 4.0 | 255 |
| 4.5 | 270 |
| 5.0 | 280 |

No separation of sands and slimes was noted in a control test in which no sulfonated beta-naphthol tar was added.

The results of the foregoing tests show that the dyes and the sulfonated beta-naphthol tar were effective dispersants for the slimes in these ores and aided in the separation of sands and slimes.

In another series of tests on the above-described California gold ore, separate samples were treated with 0.15 lb./ton Nigrosine or Sap Brown at a pulp density of 40% solids in one-liter graduated cylinders and then allowed to settle for 22 minutes. In this time, 390 cc. of relatively coarse-grained material settled out cleanly. The major portion of the slimes was contained in the supernatant 610 cc. of pulp and these slimes were readily drawn off from the sands. Both products were assayed for gold.

In a control test similarly conducted except that no dyes were used, only a relatively small quantity of sands settled out, and the separation was not clean, since the material which had settled out contained a large quantity of slimes.

The results of this series of tests are given in Table V.

The results of these tests show that by the use of dyes it was possible to disperse the slimes to such a degree that a relatively clean sand product containing the major portion of the gold could be obtained and to separate from such a product over 26% of the ore by weight as slimes containing a relatively small portion of the gold values.

JIGGING

EXAMPLE 3

Samples of about 600 g. of an ore from the Philippine Islands, containing free gold (35 mesh—600 mesh in particle size), galena, pyrite, chalcopyrite, sphalerite, limonite, quartz, and calcite and assaying about 0.45–0.55 oz./ton Au, was ground at a pulp density of 67% solids to minus 100 mesh, 58% minus 325 mesh, diluted to about 50 solids, then treated with various dyes in a series of separate tests, and subjected to a jigging operation in a laboratory jig.

A control test was similarly conducted except that no dyes were used. The results of these jigging tests are presented in Table VI. A comparison of gold recoveries in the jig concentrates in tests with and without dyes shows that an increase in recovery of over 10% was obtained in the tests employing the dyes.

*Table VI*

| Test No. | Feed | | Jig concentrate | | | Jig tailing | | |
|---|---|---|---|---|---|---|---|---|
| | Gs. | Oz./ton Au | Wt., percent | Oz./ton Au | Percent Au recov. | Wt., percent | Oz./ton Au | Percent Au recov. |
| 4 | 597.5 | 0.572 | 0.15 | 161.549 | 42.31 | 99.85 | 0.330 | 57.69 |
| 5 | 598.5 | 0.466 | 0.67 | 36.888 | 53.00 | 99.33 | 0.220 | 47.00 |
| 6 | 599.1 | 0.534 | 0.85 | 33.844 | 53.93 | 99.15 | 0.248 | 46.07 |

*Test 4.*—Control test; no dyes used.
*Test 5.*—1.0 lb./ton Sap Brown.
*Test 6.*—1.0 lb./ton Nigrosine.

The jigging operations are described above in connection with the use of a solubilized color in the absence of inorganic dispersing media. Similar excellent results are obtained when the color is mixed with some inorganic dispersing medium such as caustic soda or sodium carbonate.

TABLING

EXAMPLE 4

A carbonaceous ore containing pyrite and marcasite and assaying about 17–18% S was ground in separate tests with 0.5 lb./ton Nigrosine, Sap Brown and Sun Yellow and then subjected to a tabling operation on a laboratory Wilfley table to produce a concentrate, middling, and tailing which were assayed for sulfur. A control test was conducted similarly except that no dye was used. The results of these tests are summarized in Table VII. A marked increase in pyrite recovery in the table concentrate was noted in the

*Table V*

| Test No. | Feed | | Slimes | | | | Sands | | | |
|---|---|---|---|---|---|---|---|---|---|---|
| | Gs. | Oz./ton Au | Gs. | Wt., percent | Oz./ton Au | Total Au, percent | Gs. | Wt., percent | Oz./ton Au | Total Au, percent |
| 1 | 473.0 | 0.087 | 290.0 | 61.31 | 0.088 | 62.07 | 183.0 | 38.69 | 0.085 | 37.93 |
| 2 | 468.0 | 0.089 | 125.0 | 26.71 | 0.053 | 15.73 | 343.0 | 73.29 | 0.103 | 84.27 |
| 3 | 470.0 | 0.093 | 125.0 | 26.60 | 0.045 | 12.90 | 345.0 | 73.40 | 0.110 | 87.10 |

*Test 1.*—Control test; no dye used.
*Test 2.*—0.15 lb./ton Nigrosine.
*Test 3.*—0.15 lb./ton Sap Brown.

tests employing the dyes as is indicated by the sulfur recovery.

Table VII

| Test No. | Feed | | Concentrate | | | Middling | | | Tailing | | |
|---|---|---|---|---|---|---|---|---|---|---|---|
| | Gs. | Assay Percent S | Weight, Percent | Assay Percent S | Recov. Percent S | Weight, Percent | Assay Percent S | Recov. Percent S | Weight, Percent | Assay Percent S | Recov. Percent S |
| 7 | 2946.4 | 17.85 | 15.37 | 41.94 | 36.14 | 18.94 | 31.96 | 33.89 | 65.69 | 8.14 | 29.97 |
| 8 | 3090.6 | 17.55 | 23.18 | 40.06 | 52.93 | 20.43 | 17.40 | 20.23 | 56.39 | 8.36 | 26.84 |
| 9 | 3005.7 | 17.94 | 29.99 | 36.92 | 61.71 | 27.41 | 11.96 | 18.28 | 42.60 | 8.42 | 20.01 |
| 10 | 3020.6 | 17.37 | 21.38 | 38.06 | 46.86 | 18.90 | 21.94 | 23.89 | 59.72 | 8.50 | 29.25 |

Test 7.—Control test; no dye used.
Test 8.—0.5 lb./ton Nigrosine.
Test 9.—0.5 lb./ton Sap Brown.
Test 10.—0.5 lb./ton Sun Yellow.

The tabling operations are described above in connection with the use of a solubilized color in the absence of inorganic dispersing media. Similar excellent results are obtained when the color is mixed with some inorganic dispersing medium such as caustic soda or sodium carbonate.

AMALGAMATION

EXAMPLE 5

A gold ore from South Africa containing pyrite, magnetite, iron oxides, chalcopyrite, quartz and carbonaceous material and assaying about 0.12–0.14 oz./ton Au, 4.38% Fe, 2.29% S, 0.54% C, and 86.4% insoluble, was ground to about 5% on 65 mesh, 49% minus 200 mesh, was treated with 1.0 lb./ton Sap Brown, and then amalgamated. A control test was similarly conducted except that no Sap Brown was used. The results of both tests are presented in Table VIII. An increase in gold recovery in the mercury was noted in the test in which Sap Brown was used.

Table VIII

| Test No. | Mgs. Au | | | Percent total Au | |
|---|---|---|---|---|---|
| | In feed | In Hg | In tail | In Hg | In tail |
| 11 | 2.648 | 1.320 | 1.328 | 49.85 | 50.15 |
| 12 | 2.618 | 1.390 | 1.228 | 53.09 | 46.01 |

Test 11.—Control test; no Sap Brown used.
Test 12.—1.0 lb./ton Sap Brown.

The amalgamating operations are described above in connection with the use of a solubilized color in the absence of inorganic dispersing media. Similar excellent results are obtained when the color is mixed with some inorganic dispersing medium such as caustic soda or sodium carbonate.

It will be noted that the present invention is quite generally applicable to various dispersing and allied problems and it is applicable in media which have not been altered from their natural state and also pulps which have been rendered acid or alkaline by the addition of suitable conditioning reagents. The fact that the dispersants of the present invention can be used with certain known inorganic dispersants such as caustic soda, sodium carbonate, and the like, is an important advantage because in some cases the extreme cheapness of the inorganic material permits a lower overall cost by using both the inorganic material and the colors of the present invention. As many operations have to be carried out at very low cost, the savings thus effected are frequently important. On the other hand, it is also an outstanding advantage of the present invention that the colors used do not have to be applied with inorganic materials. The fact that the colors of the present invention may be used both in combination with inorganic dispersants and without them gives the present invention an extraordinary flexibility, permitting it to be adapted to problems of the most varying character.

It is an advantage of the present invention that the improvements obtained by the use of solubilized colors are not limited to the use of any particular ore-dressing procedure. For example, it may be found advisable in certain cases to add the dispersant to the grinding circuit; in other cases, the reagent may be used more efficiently when added to the classifier or some other point in the circuit.

What I claim is:

1. A method of separation of ore materials by differential settling which comprises subjecting an aqueous suspension containing slimy and coarser ore materials including gangue slime to differential settling in the presence of a coloring matter included in the group consisting of sulfonated Nigrosine, Sap Brown, sulfonated beta-naphthol still tars and Sun Yellow.

2. A method of separation of ore materials by differential settling which comprises subjecting an aqueous suspension containing slimy and coarser ore materials including gangue slime to differential settling in the presence of sulfonated Nigrosine.

3. A method of separation of ore materials by differential settling which comprises subjecting an aqueous suspension containing slimy and coarser ore materials including gangue slime to differential settling in the presence of Sap Brown.

4. A method of separation of ore materials by differential settling which comprises subjecting an aqueous suspension containing slimy and coarser ore materials including gangue slime to differential settling in the presence of sulfonated residue from beta-naphthol stills.

5. A method of separating ore materials by differential settling which comprises subjecting an aqueous pulp of ore materials containing gangue slimes to stratification by discontinuous acceleration of the tabling and jigging type, the stratification taking place in the presence of a coloring matter included in the group consisting of sulfonated Nigrosine, Sap Brown, sulfonated beta-naphthol still tars and Sun Yellow.

6. A method of separating ore materials by differential settling which comprises subjecting an aqueous pulp of ore materials containing gangue slimes to stratification by discontinuous acceleration of the tabling and jigging type, the stratification taking place in the presence of sulfonated Nigrosine.

7. A method of separating ore materials by differential settling which comprises subjecting an aqueous pulp of ore materials containing gangue slimes to stratification by discontinuous acceleration of the tabling and jigging type, the stratification taking place in the presence of Sap Brown.

8. A method of separating ore materials by differential settling which comprises subjecting an aqueous pulp of ore materials containing gangue slimes to stratification by discontinuous acceleration of the tabling and jigging type, the stratification taking place in the presence of sulfonated residue from beta-naphthol stills.

9. A method according to claim 1 in which the operation is effected in the presence of an alkaline inorganic dispersing medium.

10. A method according to claim 5 in which the operation is effected in the presence of an alkaline inorganic dispersing medium.

ROBERT B. BOOTH.